United States Patent [19]
Seifert

[11] 3,945,326
[45] Mar. 23, 1976

[54] RAILWAY VEHICLE

[76] Inventor: Arthur Seifert, Box 41, Sound View Station, New York, N.Y. 10472

[22] Filed: Jan. 22, 1975

[21] Appl. No.: 542,960

[52] U.S. Cl............................................. 105/215 C
[51] Int. Cl.² ......................................... B61F 13/00
[58] Field of Search ................................ 105/215 C

[56] References Cited
UNITED STATES PATENTS

| | | | |
|---|---|---|---|
| 2,043,703 | 6/1936 | Main............................... | 105/215 C |
| 2,162,351 | 6/1939 | Main............................... | 105/215 C |
| 3,020,858 | 2/1962 | Perkins et al................... | 105/215 C |
| 3,434,432 | 3/1969 | Seifert............................. | 105/215 C |

*Primary Examiner*—John J. Love
*Attorney, Agent, or Firm*—John J. Hart

[57] ABSTRACT

The vehicle disclosed herein is provided with a running gear composed of two transverse aligned drive units each provided with a wheel axle having mounted on the outer end thereof a rail wheel and a tire wheel. The inner ends of the drive units are connected by means forming a movable joint between such inner ends to enable the units to be moved from positions in which the rail wheels are operable and the tire wheels are inoperable to positions in which the tire wheels are operable and the rail wheels are inoperable, such connecting means also including means to restrict the relative movements of the two drive units. The two drive units are pivotally connected to the vehicle by means which enables lateral movement of such units during the pivotal movements of the latter in one direction or the other. Means are provided to raise the jointed inner ends of the drive units to transfer the drive of the vehicle from rail wheels to tire wheels and to lower such jointed inner ends of the drive units from their raised position to return the drive of the vehicle to rail wheels. The rail wheels each have a riding surface which converges toward the flange thereof so that a line projecting inwardly from such surface is disposed at a given acute angle to the central longitudinal axis of the wheel axle. The tire wheels have a tread surface which converges outwardly so that a line projecting outwardly from such surface is disposed at a given acute angle to the central longitudinal axis of the wheel axle. The tire is mounted on a frustoconically shaped rim of such angularity that a line projecting outwardly from such rim is parallel to said projecting tread surface line.

8 Claims, 2 Drawing Figures

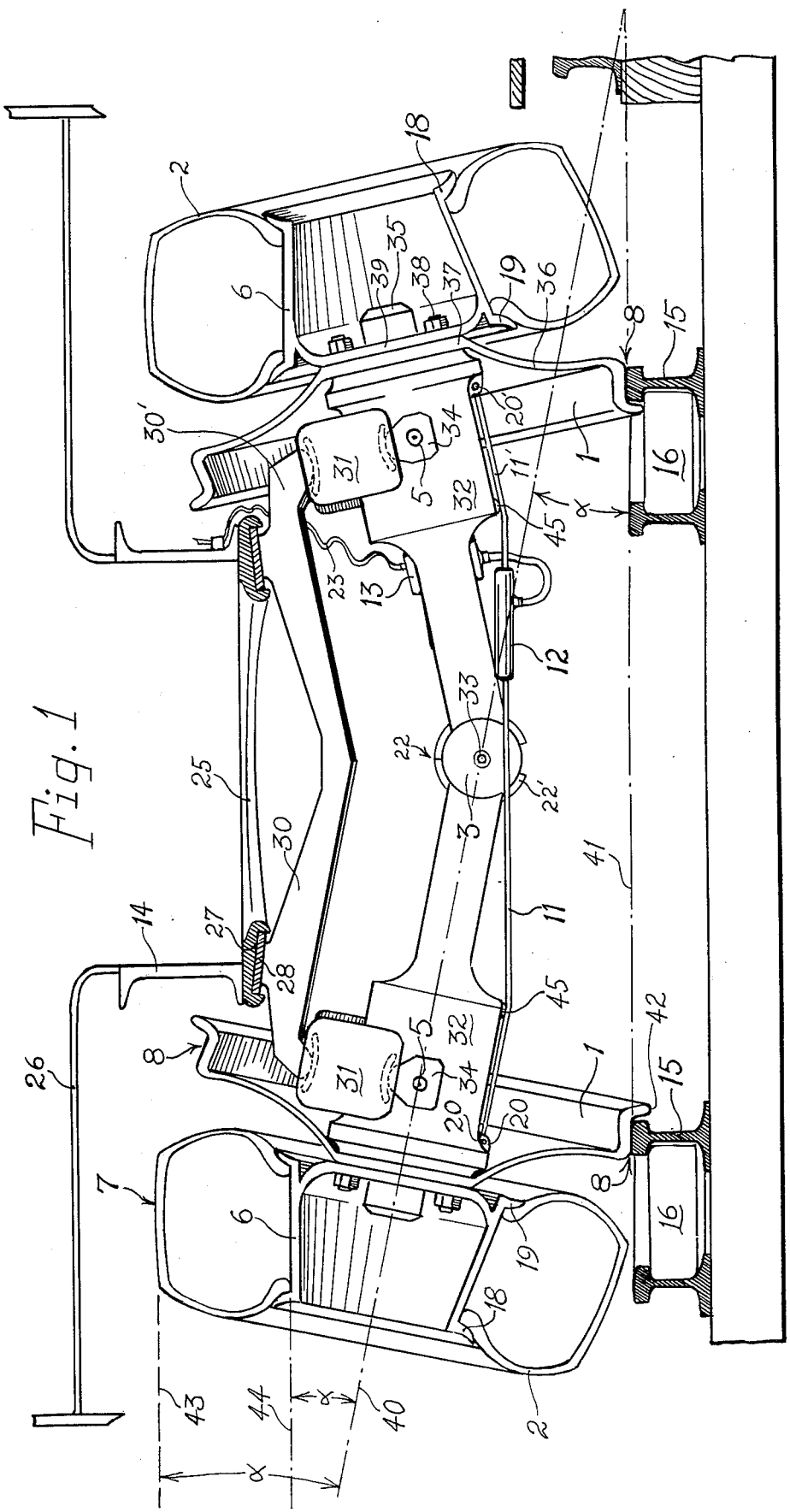

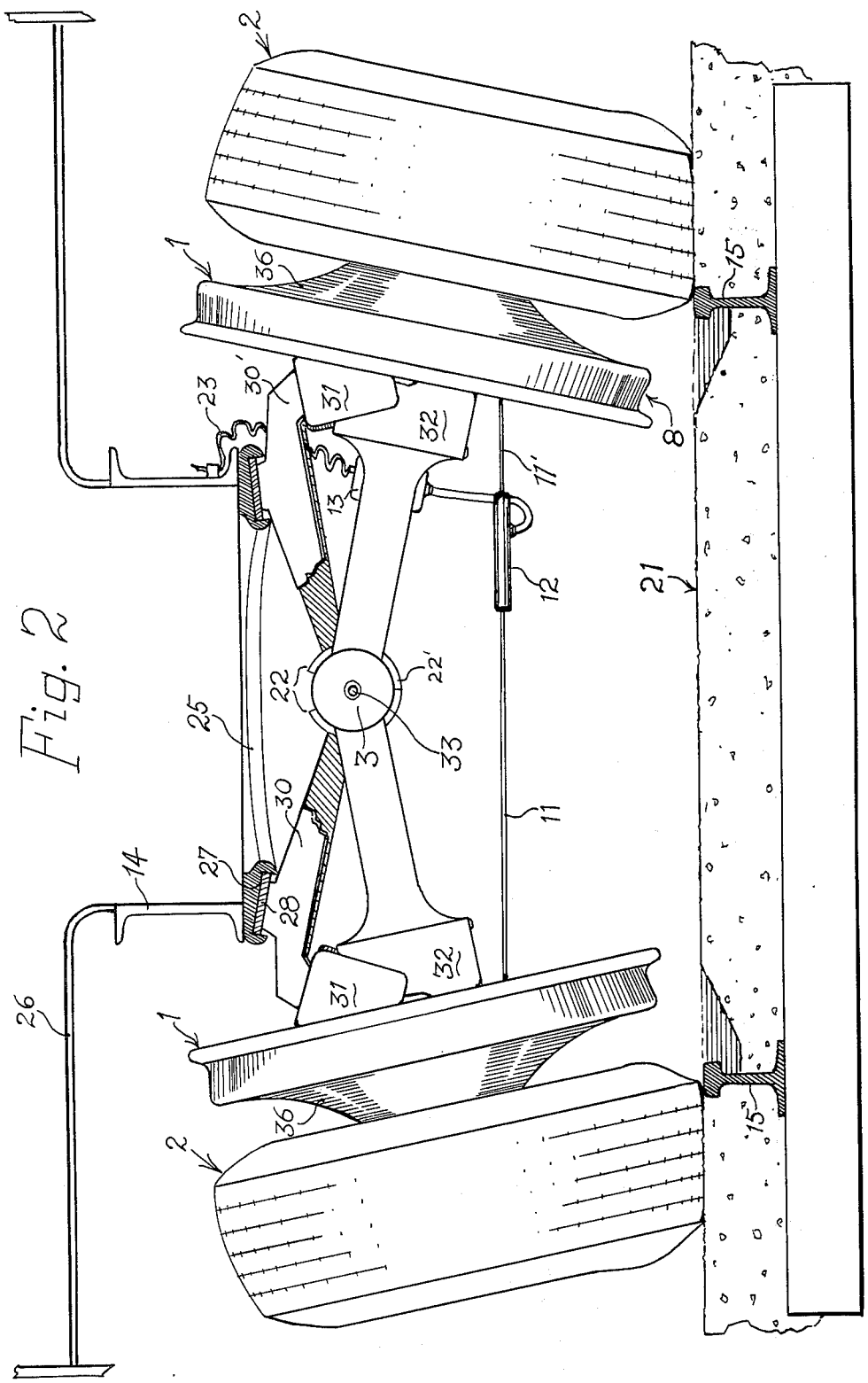

RAILWAY VEHICLE

THE INVENTION

This invention relates to railway vehicles and provides distinct advantages for those urban and suburban transportation systems which are based upon the use of a vehicle designed for both rail and road operations such as the type of vehicle disclosed in my U.S. Pat. No. 3,434,432 granted Mar. 25, 1969.

In the operation of the vehicle disclosed in my aforesaid patent, it made its transfer from the rail tracks to the roadway and vice versa, at given locations by means of ramps constructed to cause the pneumatic tires riding thereon to lift the rail wheels associated therewith onto and off the rails depending on the direction in which the vehicle was traveling on the ramp. This method of transferring the vehicle required major changes to the rail right of way, in the removal of switches and modification of the same, that were costly and impractical.

A further problem, and this is not limited to the type of vehicle disclosed in my aforesaid patent, but applies also to the standard railroad cars now in use, is the side-cutting of rails and switches and the wear on the wheel flanges due to the construction of the present type of rail wheel. Not only is this resulting wear on tires and rails a costly burden to the railroads, but the sharp-edged tire flanges produced by this wear are the cause of many derailments. The high frictional resistance involved in such unwanted wear also generates a disconcerting wheel squeal and causes considerable resistance to the operableness of the train. The added drag to a train caused by this friction necessitates that the fuel consumption thereof be greatly increased over that otherwise required. The only known method presently employed to cope with this problem is lubrication of the tracks.

One of the principal objects of the present invention is to provide in a vehicle of the indicated type an improved running gear construction that will enable the vehicle to be used on existing rail beds without necessitating that any changes be made in the latter or the use of ramps.

Another object of the invention is to provide an improved rail wheel design which will lessen the disadvantages of the presently constructed rail wheel and enable the vehicle to operate satisfactorily without the front guide wheels provided on the vehicle disclosed in my aforesaid prior patent.

Other objects of the invention as well as the novel features thereof will appear from a consideration of the following description, when read in connection with the accompanying drawings, in which FIG. 1 is an elevational view of one of the wheel trucks of the vehicle and shows the manner in which the rail wheels of the truck are mounted on the rails of a railway on which the vehicle is traveling; and FIG. 2 is a view similar to FIG. 1 and shows the arrangement of the parts when the wheel truck is traveling on a roadway.

It will be understood that while certain features of the invention are applicable to all rail vehicles, when the features of the invention are embodied in a vehicle of the type disclosed in my aforesaid U.S. Pat. No. 3,434,432, such vehicle will include a bus body mounted on a frame supported through front and rear mountings on the running units or wheel trucks. The front and rear mountings will be each composed of two relatively movable, circular bearing surfaces and will be connected by crossed steering cables. A conventional steering wheel in the bus may be connected to one of the bearing surfaces of the front mounting in the manner disclosed in said patent.

In accordance with this invention, the front and rear mountings for the front and rear running gear unit each comprise an annular bearing member 25 fixedly secured to the frame 14 of the vehicle body 26 in any suitable manner. The annular member 25 is provided with two depending peripheral guide flanges defining on the underside of the member 25 a circular bearing surface 27 against which is rotatably seated the upper surface of a circular annular bearing plate 28. The bearing plate 28 is mounted on a transverse frame 30 having at its ends depending arms 30' which are secured at their lower ends to the upper ends of two depending pneumatic springs 31 of standard construction. Secured to the lower end of each pneumatic spring 31 are two depending straps 34 which at their lower ends are pivotally connected at 5 to the drive housing 32 containing the motor for driving the associated rail wheel 1 and pneumatic wheel 2. Thus, the entire weight of the vehicle will through the frame 14, bearing members 25 and 28, frame 30 and its arms 30', pneumatic springs 31, straps 34 and pivot connections 5, bear on the outer end portions of the two drive housings 32,32 in each of the front and rear running gear units of the vehicle.

The two drive housings 32,32 in each running gear unit are connected together at their inner ends by a ball joint elbow connection 3 of known construction to permit of pivotal movement of such housings about the pivots 5 in a vertical plane at right angles to the longitudinal centerline of the bus. During such pivotal movement of the drive housings the pivotal axis 33 of such elbow connection 3 reciprocates vertically in a vertical plane containing such centerline. This toggle-like movement of the drive housings 32,32 is facilitated by the action of the pneumatic springs 31 which in addition to their cushioning functions, permit the minor lateral changes in position of such housings which are necessary to enable them to effect such movement. The elbow connections 3 in each of the running gear units is provided with two sets of coacting dogs, one set 22 coacting to limit the downward movement of the elbow connection, pivot axis 33 as is shown in FIG. 1 of the drawings, and the other set 22' of such dogs coacting to limit the upward movement of the pivotal axis 33 as shown in FIG. 2 of the drawings. Upward movement of the pivotal axis 33 and of the inner ends of the housings 32,32 about the pivots 5 to the positions shown in FIG. 2, is attained by transversely extending cable lengths 11,11' attached at their outer ends to the outer end portions of such housings at the points 20,20', respectively. The points of cable attachment 20,20' are located outwardly of the two pivot points 5,5 of such housings. The inner ends of the cables 11,11' are connected to a conventional hydraulic piston unit 12 which is driven by a servo pump 13 of known construction and connected by electrical wiring 23 to an operator controlled switch mounted on the dashboard of the bus in a manner known to the art. When the hydraulic pressure in the piston unit 12 is released to enable the housings 32,32 to assume the positions shown in FIG. 1 of the drawings, the weight of the vehicle on the pivot points 5 forces the points 20,20' apart and the elbow connection downwardly, thereby causing the housings 32,32 to pivot downwardly until the dogs 22,22 engage to stop such movement. It will be understood that such downward movement of the housings may be rendered more positive by connecting cable lengths to the upper outer end portions thereof in the manner of the cables 11,11' and controlling their operation by a piston unit and servo pump controlled from the dashboard of the bus in the manner above described with respect to the unit 12 and pump 13.

In a manner similar to that shown in my U.S. Pat. No. 3,434,432, each of drive housings 32 contains a wheel axle 35 that is driven through a fluid drive or other suitable torque converter transmission by an electrical motor also contained in the housing. On the outer end of each axle 35 is a wheel assembly composed of a hollow rail wheel 1 having an outwardly extending portion 36 terminating in an offset central wall portion 37 which abuts and is secured by lug bolts 38 to the inner wall 39 of a hollow rim 6 for the pneumatic tire 2. Thus, the outer end of each axle 35 has mounted on the outer end thereof as a unit, a rail wheel 1 and a tire wheel 2. Conventional brakes are associated with the connected pairs of pneumatic and rail wheels in the manner shown in my aforesaid patent.

It is to be noted in FIG. 1 of the drawings that when the rail wheels 1 are resting on the rail tracks 15 they tilt inwardly from the vertical in the upward direction so that the axle 35 associated with each wheel is disposed at an angle to the horizontal less than 90°. It is also to be noted that the riding surface 8 of each wheel 1 converges or inclines inwardly toward the flange 42 of the rail wheel. As is shown in FIG. 1 of the drawings, a line 41 forming an inward extension of such riding surface 8 is disposed at an acute angle $\alpha$ to an axial centerline 40 projecting inwardly from such rail wheel and common to the central longitudinal axle of the wheel axle 35. It has been found that in a vehicle of the type above described, if this angle $\alpha$ is between 5° and 25° there will result a proper and securer seating alignment of the rail wheel riding surfaces with the running surfaces of the rails, while at the same time, the flanges on the rail wheels will be disposed at such curved relationship to the inside vertical surface on the head of the rail that there is substantially less area of contact therebetween than normally occurs between said rail surface and the flange of the customary type of rail wheel. This, it is believed effects a substantial reduction in friction between such two contacting surfaces resulting in less flange and rail wear and squeal. The preferred angular disposition of the riding surfaces 8 of the rail wheels when such wheels are mounted on a bus as above described is approximately 10°, but this angular disposition may be increased substantially above 25° when such wheels form part of the usual running gear used solely for railroading purposes.

The pneumatic wheels 2 also have an acute angle relationship between the tread surfaces 7 thereof and the axial center lines thereof, but in a direction opposite to that of the rail wheel riding surfaces 8. Thus, as shown in FIG. 1 of the drawings, while the pneumatic wheels 2 are tilted inwardly upwardly so that as a whole each wheel tire is disposed substantially parallel to each tire wheel as a whole, the tread surface 7 of each tire converges or inclines outwardly toward the outwardly projecting portion 40' of the axial centerline of that tire wheel. The angular relation is preferably such that a line 43 forming an outward extension of the tread surface 7 will form with the outwardly projecting axial centerline 40' an acute angle substantially similar to the aforesaid angle $\alpha$; that is, between 5° and 25°. With the tread surfaces 7 disposed in this angular fashion, the tires will properly engage the road surface when the running gear parts are arranged as shown in FIG. 2 of the drawings. Proper use of the tires, together with efficient traction and improved tire side roll characteristics will be achieved if the tire rims 6 are also constructed to conform to this angular relation. Thus, as is shown in FIG. 1, the outside retainer lip 18 of the rim 6 is made smaller in diameter than the rims inside retainer lip 19 and the dimensions thereof are so related that a line 44 forming an outward extension of the resulting frusto-conically shaped tire seat of the rim 6 will also form with the axial line 40' the acute angle $\alpha$.

It will be understood from the foregoing, that when the parts of the front and rear running gear units of the bus are arranged as shown in FIG. 1 of the drawings with the rail wheels 1 in their lowermost position and riding on the tracks 15, the elbow connectors 3 will be in their lowermost positions with the dogs 22 associated therewith in abutting engagement, and the pneumatic wheels 2 will be in a raised position and located above the rail tracks. In such arrangement of the running gear parts, the bus can properly travel on the railroad tracks without the pneumatic wheels 2 coming into contact with rail switches 16 in FIG. 1 or rail crossings 21 in FIG. 2. As previously indicated, such travel, due to the unique configuration of the riding surfaces 8 of the rail wheels, will be accomplished with a minimum or friction, flange wear and squeal and with a sureness of seat by the wheels on the rails that the possibility of derailment is minimized.

When the bus arrives at a rail crossing 21 in FIG. 2 at which the operator is to leave the railroad for travel on the highway, and while the bus is still in motion, the operator activates the servopump 13 to cause the piston unit 12 and cables 11,11' to pivot the drive housings 32 about their pivotal axes 5 and raise the elbow connection 3 until the dogs 22' come into engagement and stop such movement. It is to be noted that the points 20,20' to which the outer ends of the cables 11,11' respectively, are connected, are located on the underside of the drive housing 32 outwardly of the pivots 5,5, and that such cables are in engagement with abutments 45,45' provided on the underside of such drive housings 32 inwardly of the pivots 5,5. When the parts are arranged in the manner shown in FIG. 1, the abutments 45,45' will be lower vertically than the points 20,20'. Accordingly, when the piston unit 12 exerts contracting forces on the cables 11,11', an upward force will initially be exerted by such cables on the abutments 45,45' and then as the cables become horizontal between the points 20,20', at which time the abutments 45,45' and the housings 32,32 will be horizontally aligned, the contracting forces exercised by the piston unit 12 on the cables 11,11' will be applied directly on the points 20,20' to pivot the housings 32 and raise the joint 3 until the dogs 22' come into engagement, as shown in FIG. 2 of the drawings. Thus, the housings 32, their elbow joint 3, the cables 11,11', the piston unit 12, the connections 20,20' and the abutments 45,45', function in the nature of a toggle joint to pivot the housings 32, within a range the limits of which are determined by the dogs 22,22'. The pneumatic springs 31 permit the housings 32 during such upward movement to shift laterally outwardly as the pivotal axis 33 passes through a horizontal plane momentarily containing the longitudinal axes of such housings and then move the housings laterally inwardly as the inner ends of the housings move above such plane. During such upward pivotal movement of the housings 32, the pneumatic tires 2 will pivot downwardly about the pivots 5 until the tread surfaces 7 thereof come into engagement with the crossing 21 and then as the housings complete their turning movement the tires 2 will press on the crossing 21 and cause the rail wheels 1 to be raised from the rails 15 in the manner shown in FIG. 2 of the drawings. The bus will then be in a condition to proceed on its journey along the highway.

When the bus is to be remounted on the rail tracks, it is driven onto the crossing 21 where this transfer is to take place and properly aligned with the rail tracks. While the bus is still in motion, the operator then actuates the servo pump 13 to cause the piston unit 12 to release its contracting force on the cables 11,11', whereupon the weight of the vehicle bearing on the pivots 5,5 will force the inner ends of the housings 32 and the elbow joint 3 downwardly until the parts assume the arrangement shown in FIG. 1 of the drawings. As previously explained this action may be made more positive by installing above the housings 32 an arrangement similar to that shown with respect to the cables 11,11', piston unit 12, servo pump 13, points 20,20' and abutments 45,45'.

What is claimed is:

1. In a vehicle adapted to travel on rail or highway, a running gear composed of two transverse wheel axles, first means movably connecting the inner ends of said wheel axles together, a first pair of rail wheels mounted on the outer ends of said axles, a second pair of tire wheels mounted on the outer ends of said axles, said first connecting means having a lowered position in which one of said pairs of wheels are rendered operable and the other pair inoperative, and having a raised position in which said one pair of wheels are rendered inoperative and said other pair operative, second means movably connecting said wheel axles to the vehicle, and means operable to raise said first connecting means and to move said shafts about said second connecting means to bring one of said pairs of wheels into operative position, and operable to lower said first connecting means and to move said shafts about said second connecting means to bring the other of said pairs of wheels into operative position.

2. In a vehicle adapted to travel on a railway or a highway, a running gear composed of two transverse aligned drive units each provided with a wheel axle having mounted on the outer end thereof a wheel unit constituted of a rail wheel and a tire wheel, first means connecting the inner ends of the said drive units, said first connecting means having a lowered position in which said rail wheels are rendered operable and said tire wheels inoperative, and having a raised position in which said rail wheels are rendered inoperative and said tire wheels operative, second means pivotally connecting said drive units to the vehicle, and means operable to raise said first connecting means and thereby turn said drive units about said pivotal connections thereof with said vehicle to bring said tire wheels into operative position, and operable to lower said first connecting means and thereby turn said drive units about said pivotal connections to bring said rail wheels into operative position.

3. In a vehicle as defined in claim 2, in which said first connecting means comprises means forming a movable joint between the inner ends of said drive units and means to restrict the movements of said joint means so as to confine the rising and lowering movements of the inner ends of said drive units to a given range of movement.

4. In a vehicle as defined in claim 3, in which said second connecting means includes means enabling lateral movement of said units during the rising and lowering movements of the latter.

5. In a vehicle as defined in claim 2, in which said second connecting means is constructed and arranged to apply the weight of the vehicle at the pivotal connections of said means with said drive units, and in which said operable means is constructed and arranged to utilize the vehicle weight at said pivotal connections during the lowering of said first connecting means.

6. In a vehicle as defined in claim 2, in which said rail wheel has a rail flange on the inner periphery thereof, and in which the riding surface of said rail wheel converges toward said flange and a line projecting inwardly from such surface is disposed at a given acute angle to the axial centerline of such rail wheel.

7. In a vehicle as defined in claim 2, in which said tire wheel has a tread surface converging outwardly so that a line projecting outwardly from such surface is disposed at a given acute angle to the axial centerline of said tire wheel.

8. In a vehicle as defined in claim 7, in which said tire wheel has a frusto-conically shaped rim of such angularity that a line projecting outwardly from such rim is parallel to said projecting tread surface line.

* * * * *